US012558913B2

(12) United States Patent
Kozlowski et al.

(10) Patent No.: US 12,558,913 B2
(45) Date of Patent: Feb. 24, 2026

(54) RECORDING MATERIAL FOR DYE SUBLIMATION PRINTING HAVING IMPROVED TRANSPORT PROPERTIES

(71) Applicant: SCHOELLER TECHNOCELL GMBH & CO., KG, Deutschland (DE)

(72) Inventors: Christoph Kozlowski, Deutschland (DE); Michael Krause, Deutschland (DE); Andreas Diekmann, Deutschland (DE); Hans-Ulrich Berner, Deutschland (DE)

(73) Assignee: SCHOELLER TECHNOCELL GMBH & CO. KG, Deutschland (DE)

(*) Notice: Subject to any disclaimer, the term of this patent is extended or adjusted under 35 U.S.C. 154(b) by 105 days.

(21) Appl. No.: 18/275,770

(22) PCT Filed: Feb. 4, 2022

(86) PCT No.: PCT/EP2022/052693
§ 371 (c)(1),
(2) Date: Aug. 3, 2023

(87) PCT Pub. No.: WO2022/167572
PCT Pub. Date: Aug. 11, 2022

(65) Prior Publication Data
US 2024/0083187 A1 Mar. 14, 2024

(30) Foreign Application Priority Data
Feb. 4, 2021 (EP) .................................... 21155249

(51) Int. Cl.
*B41M 5/44* (2006.01)
*B41M 5/385* (2006.01)
*B41M 5/398* (2006.01)

(52) U.S. Cl.
CPC .............. *B41M 5/44* (2013.01); *B41M 5/385* (2013.01); *B41M 5/398* (2013.01);
(Continued)

(58) Field of Classification Search
CPC ........ B41M 5/44; B41M 5/385; B41M 5/398; B41M 2205/02; B41M 2205/36; B41M 2205/38; B41M 5/42; B41M 2205/32
(Continued)

(56) References Cited

U.S. PATENT DOCUMENTS

2003/0007058 A1* 1/2003 Odamura .............. B44C 1/1712
347/187
2006/0159872 A1* 7/2006 Olijve .................. B41M 5/5236
428/32.24
(Continued)

FOREIGN PATENT DOCUMENTS

EP 0409598 A2 1/1991
EP 3028866 A1 6/2016
(Continued)

OTHER PUBLICATIONS

PCT/EP2022/052693 International Search Report dated May 17, 2022.
EP 21155249.2 Search Report dated Jul. 30, 2021.

*Primary Examiner* — Betelhem Shewareged
(74) *Attorney, Agent, or Firm* — Honigman LLP

(57) ABSTRACT

The invention relates to recording material for dye sublimation printing comprising base paper (1) having a front and a rear side, at least one synthetic resin layer (4) on at least the rear side of the base paper (1), a dye-receiving layer (2) which is arranged on the front side of the base paper (1), at least one plastic film (3) which is arranged between the base paper (1) and the dye-receiving layer (2) and optionally a barrier layer which is arranged between the plastic film (3)
(Continued)

Figure 1:

and the dye-receiving layer (2), wherein the synthetic resin layer (4) has an elastic modulus of at least 0.8 GPa.

13 Claims, 2 Drawing Sheets

(52) U.S. Cl.
CPC ..... *B41M 2205/02* (2013.01); *B41M 2205/36* (2013.01); *B41M 2205/38* (2013.01)

(58) Field of Classification Search
USPC ........................................................ 428/32.62
See application file for complete search history.

(56) References Cited

U.S. PATENT DOCUMENTS

| | | | | |
|---|---|---|---|---|
| 2016/0159126 | A1* | 6/2016 | Kozlowski | B41M 5/5218 428/32.5 |
| 2020/0307296 | A1 | 10/2020 | Hatakeyama et al. | |
| 2024/0083187 | A1* | 3/2024 | Kozlowski | B41M 5/42 |

FOREIGN PATENT DOCUMENTS

| | | | |
|---|---|---|---|
| JP | 2016107641 | A | 6/2016 |
| JP | 2020157572 | A | 10/2020 |

* cited by examiner

RECORDING MATERIAL FOR DYE SUBLIMATION PRINTING HAVING IMPROVED TRANSPORT PROPERTIES

CROSS-REFERENCE TO RELATED APPLICATIONS

This application is a National Stage Application and claims priority under 35 U.S.C. § 371 to Patent Cooperation Treaty application PCT/EP2022/052693, filed Feb. 4, 2022, which claims the benefit of European Patent Application No. 21155249.2, filed Feb. 4, 2021. Priority is claimed to these applications and the disclosures of these prior applications are considered part of the disclosure of this application and to the extent allowed the entire contents of the aforementioned applications are incorporated herein.

The invention relates to a recording material for dye sublimation printing.

Dye sublimation printing serves to reproduce a digitally generated image in the form of a printed image the image quality of which corresponds to the level of silver salt photography. The digital image is processed in a punctiform manner with respect to the primary colors cyan, magenta, yellow, and black and converted into corresponding electrical signals, which are then converted locally into heat by means of a thermal head in the printer. The local heat causes the dye to sublimate from the donor layer of an ink ribbon or ink sheet in contact with the recording material to be printed and diffuse into the dye-receiving layer of the recording material.

Originally, it was assumed for dye sublimation printing that the dye would be converted directly from the solid to the gaseous state, i.e., sublimated, by the effect of heat alone. However, it was later discovered that a certain liquefaction of the dye can indeed occur during dye sublimation printing, which means that a more accurate description for the process that takes place is given by diffusion effects (so-called dye diffusion thermal transfer; D2T2). Depending on the thermal energy supplied to the pixel, a different quantity of dye is transferred to the recording material.

To obtain photo-quality images, a recording material for dye sublimation printing must have, among other things, a good surface, low thermal conductivity, good heat resistance, good compressibility and good dimensional stability. Furthermore, the recording material for the dye sublimation printing has to have good storage stability after printing in order to prevent migration of the dyes through the carrier over time and associated image quality degradation.

The compressibility of the recording material is important to ensure good contact between the thermal head of the printer and the recording material. During the printing process, the exact positioning of the recording material in relation to the print heads is important, since only one of the four primary colors (cyan, magenta, yellow, and black) can be applied at a time during each printing process. For this reason, the print image must be produced by applying dye in four successive runs (so-called multi pass method). Since the same color pixel has to be precisely aligned up to four times at the same printing position in order to produce the desired color tone, a change in the positioning of the recording material in relation to the print heads during the application of the colorant leads to a deterioration in image quality. Such a change in positioning (so-called offset) can be caused, for example, by transport difficulties for the recording material in the printer.

The transport rollers used in the printers specially developed for dye sublimation printing, such as WXL-185 2017 from Mitsubishi, DNP DS-621 or Citizen CX, have a surface roughness with needle-shaped elevations which are intended to ensure a good connection to the recording material. However, due to the properties of the contact surfaces of the recording material and the transport rollers of the printer, friction occurs during the transport of the recording material in the printer, which means that optimal positioning of the recording materials relative to the print head cannot be guaranteed. In successive printing processes, there is an offset between the print image already applied and the print image applied in the subsequent printing process, and thus an impairment of print image quality.

Recording materials for dye sublimation printing have already been adequately described in the prior art. They consist essentially of a carrier material, a dye-receiving layer and optionally further functional layers.

Uncoated or coated papers, for example, are used as carrier materials, wherein papers coated with synthetic resins, in particular polyolefin-coated papers, or papers provided with a multilayer plastic film are considered particularly suitable. Such carrier materials are described, for example, in EP 3 028 866 A1.

The dye-receiving layer mainly contains a resin which has an affinity for the dye from the donor layer of the ink ribbon or ink sheet. For this purpose, for example, plastics with ester compounds, such as polyester resins, polyacrylic acid ester resins, polycarbonate resins, polyvinyl acetate resins, styrene acrylate resins, or plastics with amide compounds, such as polyamide resins, or polyvinyl chloride, and mixtures of the aforementioned plastics are used. The use of copolymers which contain at least one of the abovementioned plastics as the main constituent, such as vinyl chloride/vinyl acetate copolymer, is also known in the prior art.

So-called anticurl layers are used as further functional layers, for example, to counteract curling of the recording material after it has passed through the thermal printer. Plastic films, for example, which are laminated onto the rear side of the recording material are well suited for this purpose. However, laminating the plastic films onto the rear side of the recording material has the disadvantage that it requires an additional method step, the complexity of the recording material is increased as a result, and the resulting surface quality of the recording material does not allow slip-free and therefore offset-free transport in the printer. In addition, there is a risk of delamination in the case of recording materials laminated with plastic films.

Another possibility described in the prior art for counteracting the curling of the recording material after it has passed through the thermal printer consists in applying a functional layer with a higher application weight and thus a greater thickness, which counteracts the curling. A disadvantage of this procedure is that it requires a high material input and is therefore uneconomical.

JP 2015 193251 describes a recording material in which a polyolefin layer was applied to both sides of the carrier material, wherein the densities and application weights of the polyolefin layers applied to both sides of the carrier material differ. However, the application of polyolefins still leads to the transport difficulties in the printer known in the prior art. Consequently, offset-free transport of the recording material in the printer is not guaranteed.

In view of the prior art described, there is therefore a need for recording materials for dye sublimation printing that do not have the described transport difficulties in the printer, or only have them to a limited extent.

It is therefore the object of the invention to provide a recording material for dye sublimation printing which, with regard to its transport properties in the printer, has improved behavior, in particular lower offset, compared to recording materials of the prior art and thus improved printing quality, while retaining the other requirements placed on a recording material used in the thermal printing method.

This object is achieved by a recording material for dye sublimation printing comprising a. a base paper having a front and a rear side
b. at least one synthetic resin layer on at least the rear side of the base paper
c. a dye-receiving layer which is arranged on the front side of the base paper,
d. at least one plastic film which is arranged between the base paper and the dye-receiving layer, and
e. optionally, a barrier layer which is arranged between the plastic film and the dye-receiving layer, wherein the synthetic dye layer has an elastic modulus of at least 0.8 GPa.

Surprisingly, it has been found that such a recording material does not have the transport difficulties in the printer described in the prior art or only has them to a significantly lesser extent. The recording material according to the invention can therefore be used to achieve significantly improved printing quality compared with the recording material of the prior art.

For the purposes of the invention, the term "base paper" is understood to mean uncoated or surface-sized paper.

A base paper may contain, in addition to pulp fibers, sizing agents such as alkyl ketene dimers, fatty acids and/or fatty acid salts, epoxidized fatty acid amides, alkenyl or alkyl succinic anhydride, wet strength agents such as polyamine-polyamide-epichlorohydrin, dry strength agents such as anionic, cationic or amphoteric polyamides or cationic starches, optical brighteners, fillers, pigments, dyes, defoamers, and other auxiliaries known in the paper industry. The base paper can be produced on a Fourdrinier or a Yankee paper machine (cylinder paper machine). The basis weight of the base paper can be 50 to 250 g/m$^2$, in particular 80 to 180 g/m$^2$. The base paper can be used in uncompacted or compacted form (smoothed). Base papers with a density of 0.8 to 1.2 g/cm$^3$, in particular with a density of 0.9 to 1.1 g/cm$^3$, are particularly suitable.

For example, bleached hardwood kraft pulp (BHKP), bleached softwood kraft pulp (BSKP), bleached hardwood sulfite pulp (BHSP) or bleached softwood sulfite pulp (BSSP) can be used as pulp fibers. Pulp fibers obtained from paper waste can also be used. The aforementioned pulp fibers can also be used in mixed form, with contents of other fibers, for example synthetic resin fibers, being added. However, pulp fibers made from 100% hardwood pulp are preferably used. The average fiber length of the unmilled pulp is preferably 0.5 to 0.85 mm (Kajaani measurement).

Fillers used in the base paper can be, for example, kaolins, calcium carbonate in its natural forms such as limestone, marble or dolomite stone, precipitated calcium carbonate, calcium sulfate, barium sulfate, titanium dioxide, talc, silica, aluminum oxide, and mixtures thereof.

The base paper can be surface-sized. Suitable sizing agents for this purpose are, for example, polyvinyl alcohol or oxidized starch. According to a particular embodiment of the invention, the sizing agent may additionally contain at least one pigment. The pigment is preferably selected from the group consisting of metal oxides, silicates, carbonates, sulfides or sulfates and mixtures thereof. Pigments such as kaolins, talc, calcium carbonate and/or barium sulfate have proved particularly effective in practice. By adding pigment to the sizing agent, the surface quality of the base paper, in particular its smoothness, can be improved.

The recording material according to the invention has at least one synthetic resin layer on at least the rear side of the base paper, wherein the synthetic resin layer has an elastic modulus of at least 0.8 GPa. The elastic modulus can be determined by means of the methods known to the person skilled in the art. Preferably, the elastic modulus is determined according to the tensile strength test described in the test section using the Lorentzen & Wettre Tensile Tester.

According to the invention, the rear side of the base paper is understood to be the side of the base paper facing the transport rollers in the printer.

According to a preferred embodiment of the invention, the synthetic resin layer has an elastic modulus of at least 0.90 GPa, particularly preferably of at least 0.95 GPa, very particularly preferably of at least 1.0 GPa.

The synthetic resin layer can preferably contain a thermoplastic polymer. According to an embodiment of the invention, biotechnologically produced polymers are used as thermoplastic polymers. According to an alternative embodiment of the invention, polymers produced from renewable raw materials are used as thermoplastic polymers. According to a further alternative embodiment, polylactic acid (PLA), and native or modified starches and mixtures thereof are used as thermoplastic polymers. Preferred thermoplastic polymers are polyolefins, for example low-density polyethylene (LD-PE), high-density polyethylene (HD-PE), polypropylene (PP), 4-methylpentene-1 homo- and copolymers (TPX), and mixtures thereof, and polyesters, for example polycarbonates.

According to a preferred embodiment of the invention, the synthetic resin layer comprises HD-PE, LD-PE, 4-methylpentene-1 homo- and copolymers (TPX), and mixtures thereof. It has proven to be particularly practical if the synthetic resin layer contains at least 40 wt. % HD-PE, in particular 60 to 80 wt. % HD-PE. The HD-PE used in the synthetic resin layer preferably has a density of more than 0.95 g/cm$^3$. It has also proven to be particularly practical if the synthetic resin layer contains up to 25 wt. % LD-PE. The LD-PE used in the synthetic resin layer preferably has a density of less than 0.935 g/cm$^3$.

In a further preferred embodiment of the invention, the synthetic resin layer contains at least 5 wt. %, in particular at least 10 wt. % TPX, preferably between 5 and 20 wt. % TPX, particularly preferably between 5 and 15 wt. % TPX, based on the dry weight of the synthetic resin layer. The addition of TPX leads to a further improvement in the surface properties of the synthetic resin layer.

According to a particularly preferred embodiment of the invention, the rear-side synthetic resin layer consists of 0 to 25 wt. % TPX, 55 to 85 wt. % HD-PE, and to 25 wt. % LD-PE, based on the dry weight of the synthetic resin layer. A recording material according to the invention having such a synthetic resin layer on the rear side has particularly good transport properties in the printer, which means that offset of the print image during printing can be largely prevented.

The synthetic resin layer can contain white pigments such as titanium dioxide and other pigments and further auxiliaries such as optical brighteners, dyes and dispersing assistants.

It has proved particularly advantageous in practice if the synthetic resin layer has a pigment content of at least 5 wt. %, in particular at least 10 wt. %, preferably at least 20 wt. %, based on the dry weight of the synthetic resin layer. The pigments are preferably selected from calcium carbonate, aluminum oxides, aluminum silicates, or mixtures thereof.

The surface properties of the synthetic resin layer can be further optimized by the addition of the pigments.

According to a particularly preferred alternative embodiment of the invention, the rear-side synthetic resin layer consists of 5 to 25 wt. % pigment, in particular calcium carbonate, 75 to 85 wt. % HD-PE, and 0 to 15 wt. % LD-PE, based on the dry weight of the synthetic resin layer. A synthetic resin layer designed in this way on the rear side of the recording material according to the invention leads to significantly lower friction with the surfaces of the transport rollers of the printer, which means that offset of the print image during printing can be significantly reduced or largely prevented.

The application weight of the synthetic resin layer can be 5 to 50 g/m$^2$, in particular 5 to 30 g/m$^2$, preferably 10 to 20 g/m$^2$.

According to a preferred embodiment, the synthetic resin layer is extruded or applied as a film.

The synthetic resin layer can be extruded onto the base paper in a single layer or co-extruded in multiple layers. The extrusion coating can be applied at machine speeds of up to 600 m/m in.

The recording material according to the invention further comprises a dye-receiving layer which is arranged on the front side of the base paper. According to the invention, the front side of the base paper is understood to mean the side of the base paper facing the print head of the printer.

In principle, any dye-receiving layer known from the prior art for dye sublimation printing is suitable as the dye-receiving layer. Preferably, the dye-receiving layer contains a polymer selected from polyester, polyacrylic acid ester, polycarbonates, styrene acrylates, vinyl homopolymers and/or vinyl copolymers, or mixtures thereof. The use of vinyl polymers such as polyvinyl chloride, vinyl chloride/acrylate copolymer, vinyl chloride/vinyl acetate copolymer, and/or vinyl chloride/vinyl acetate/vinylidene chloride, and mixtures thereof in the dye-receiving layer has proven to be particularly practical.

The dye-receiving layer can contain a polar binder, such as, for example, polyvinyl alcohol, and optical brighteners. Particularly preferred polar binders used are starch, polyethylene glycol (PEG), and polyvinyl alcohol. Polyvinyl alcohols modified with carbonyl or carboxyl groups and mixtures thereof are particularly preferred. The use of these modified polyvinyl alcohols has the advantage that they are very compatible with the optical brighteners normally used in dye-receiving layers, and therefore their use does not impair the print quality.

The quantity of the polar binders in the dye-receiving layer can be 1 to 25 wt. %, in particular 5 to 20 wt. %, based on the dry weight of the dye-receiving layer.

The optical brighteners used are particularly preferably stilbenes, ethylene, phenylethylene, or thiophene derivatives. The quantity of the optical brighteners can be 0.01 to 10 wt. %, in particular 0.05 to 5 wt. %, based on the dry weight of the dye-receiving layer.

The dye-receiving layer can further comprise an inorganic and/or organic pigment. Particularly suitable are fine-particle inorganic pigments, such as silicon dioxide, aluminum oxide, aluminum oxide hydrate, aluminum silicate, calcium carbonate, zinc oxide, tin oxide, antimony oxide, titanium dioxide, indium oxide, or a mixed oxide of these oxides, as well as mixtures thereof. The quantity of the pigment in the dye-receiving layer can be 10 to 90 wt. %, in particular 30 to 70 wt. %, based on the dry weight of the dye-receiving layer. According to a preferred design of the invention, the dye-receiving layer contains silicon dioxide, in particular fine-particle silicas, as fine-particle inorganic pigment.

The dye-receiving layer can optionally also contain other auxiliaries, for example anionic or nonionic surfactants, matting agents, dyes, crosslinking agents, slip agents, anti-blocking agents, and other customary additives. The quantity of the auxiliaries can be 0.01 to 10 wt. %, in particular 0.05 to 5 wt. %, based on the dry weight of the dye-receiving layer.

The coating composition for forming the dye-receiving layer can be applied inline or offline using any of the application units customary in paper production. After drying, the application weight of the dye-receiving layer can be at most 5 g/m$^2$, in particular 0.1 to 3 g/m$^2$. According to a particularly preferred embodiment, the application weight after drying of the dye-receiving layer is 0.3 to 1.0 g/m$^2$. It has been found that these application weights improve the color densities in printing.

It has proven to be particularly practical if the synthetic resin layer and/or the dye-receiving layer contain antistatically acting substances.

According to a preferred embodiment of the invention, the synthetic resin layer and/or the dye-receiving layer contain antistatically acting substances, in particular electrically conductive inorganic pigments. These antistatically acting substances can be added in addition to the above-mentioned pigments optionally contained in the synthetic resin layer and/or dye-receiving layer. The antistatically acting substances are preferably selected from semiconductors, betaines or ampholytes. The addition of such antistatically acting substances to the synthetic resin layer and/or dye-receiving layer has proven advantageous for counteracting charging of the recording material during storage, transport, and in the printer and thus preventing impairment of the print quality by an already charged recording material.

The recording material according to the invention comprises at least one plastic film which is arranged between the base paper and the dye-receiving layer. Preferably, the plastic film is a biaxially oriented plastic film. The plastic film can be single-layer, but preferably has a multilayer structure with a porous core layer and at least one pore-free surface layer. The porous core layer serves to provide thermal insulation, while the pore-free surface layer ensures that the surface is as smooth as possible. According to a particularly preferred embodiment, the plastic film is a biaxially oriented polypropylene film.

It has proven to be particularly advantageous if a plastic film with a thickness of 30 to 60 μm, in particular 35 to 50 μm, is used.

In order to ensure good coverage and uniform color of the recording material, the use of a plastic film with an opacity of 70 to 90% (measured according to JIS-P-8148) has proven to be particularly practical according to the invention.

According to a further embodiment of the invention, the plastic film comprises organic and/or inorganic fillers. In this case, carbonates, such as calcium carbonate or carboxylic acids, and other fillers with the potential for gas evolution, which cause foaming of the layer, are preferred.

The recording material according to the invention optionally comprises a barrier layer which is arranged between the plastic film and the dye-receiving layer.

Such a barrier layer, in addition to its barrier property, which serves to prevent the color from penetrating, usually also has an adhesive function to ensure good adhesion of the dye-receiving layer to the plastic film. Such barrier layers are described, for example, in EP 3 028 866 A1.

According to one embodiment of the invention, a mixture of gelatin and a water-dispersible polymeric binder is used as the barrier layer.

The water-dispersible polymeric binder in the barrier layer is preferably a water-dispersible polyester-polyurethane copolymer.

According to a further embodiment, crosslinkers that improve intrinsic and intermediate adhesion are used in the barrier layer. Preferably, these are polyaziridines.

The coating compositions for forming the barrier layer and the dye-receiving layer can be applied to the plastic film separately from one another and using engraving rollers, blade, curtain or all conventional application methods, i.e., first the coating composition produced for forming the barrier layer is applied to the plastic film. In the next step, the coating composition for forming the dye-receiving layer is applied to the dried barrier layer and dried.

However, the coating compositions described above can also be applied “wet-on-wet,” for example by means of a multilayer curtain coating unit.

A disadvantage of applying the barrier layer and the plastic film separately is that delamination can occur between the individual layers.

For this reason, according to a particular design of the invention, a plastic film is used which already comprises a barrier layer. By using such a plastic film, delamination between the individual layers can be prevented. Furthermore, raw material as well as a process step can be advantageously eliminated in the production of the recording material.

According to a further embodiment of the invention, an adhesive layer is located between the base paper and the dye-receiving layer. According to a preferred embodiment of the invention, the adhesive layer consists of low-density polyethylene (LD-PE).

According to an alternative embodiment of the invention, the adhesive layer can be constructed like the synthetic resin layer. That is, the adhesive layer is identical in structure to the synthetic resin layer or can be composed of the materials described above for the synthetic resin layer in the quantities specified.

The adhesive layer can be applied to the base paper by extrusion, for example, and serve as an adhesive layer for the plastic film applied on top. The thickness of the adhesive layer is preferably 10 to 30 μm, in particular 15 to 25 μm.

The invention is described with examples in more detail below, with reference to exemplary embodiments.

Figure 2:
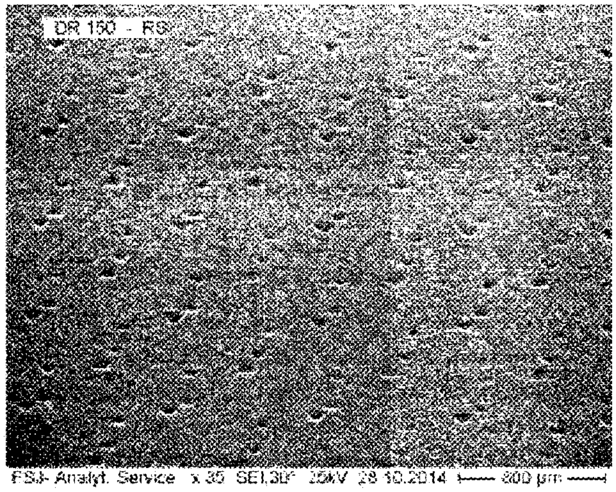
Figure 3:
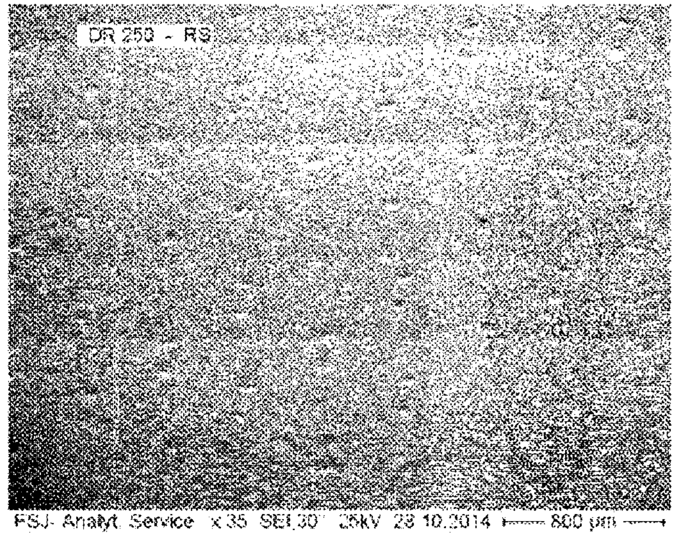
Figure 4:
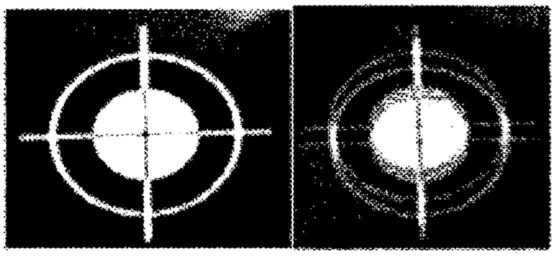

FIG. 1 a schematic structure of an embodiment of a recording material according to the invention FIG. 2 SEM image of the synthetic resin layer on the rear side of a recording material of the prior art with transport roller needle recesses, with offset FIG. 3 SEM image of the synthetic resin layer on the rear side of a recording material according to the invention with transport roller needle recesses, without offset FIG. 4 crosshairs for determining the offset FIG. 1 shows a schematic structure of a preferred embodiment of a recording material according to the invention. According to this preferred embodiment, the recording material comprises a base paper 1, on the front side of which a dye-receiving layer 2 is arranged. A plastic film 3 is arranged between the base paper 1 and the dye-receiving layer 2. The recording material has a synthetic resin layer 4 on the rear side of the base paper 1. A barrier layer 5 is arranged on the front side of the base paper 1 between the plastic film 3 and the dye-receiving layer 2. Furthermore, an adhesive layer 6 is arranged on the front side of the base paper 1 between the plastic film 3 and the base paper 1.

FIG. 2 shows an SEM image of the surface of the synthetic resin layer on a rear side of a recording material of the prior art after successive printing processes. The rear side has recesses of the transport roller needles which show a offset. Due to friction between the recording material and the transport rollers, optimal positioning of the recording material relative to the print head was not ensured, with the result that in successive printing processes there is an offset between the print image already applied and the print image applied in the subsequent printing process, and thus impairment of the print image quality. This offset can be seen on the surface of the synthetic resin layer of the rear side of the recording material using the SEM image with reference to the offset transport needle recesses.

FIG. 3 shows an SEM image of the surface of the synthetic resin layer 4 on the rear side of a recording material according to the invention after successive printing processes. In contrast to the SEM image of a rear side of a recording material of the prior art after successive printing processes shown in FIG. 2, it can be seen from FIG. 3 that the surface of the synthetic resin layer 4 on the rear side of the recording material according to the invention has no offset of the recesses of the transport roller needles. The recording material according to the invention therefore ensures optimal positioning of the recording material relative to the print head during transport in the printer, allowing excellent print image quality to be achieved during successive printing processes.

FIG. 4 shows two print images of a crosshair for determining the offset. The offset is determined from the color shift of cyan, yellow, magenta (see right crosshair) in the crosshair using a microscope. The offset is given by the sum of all color shifts. The offset is a measure of transport properties in the printer. In this case, a small offset or no offset (left crosshair) is very desirable.

EXAMPLES

Production of a Base Paper

A base paper A was produced from *eucalyptus* pulp. For milling, the pulp was milled as an approximately 5% aqueous suspension (thick stock) to a freeness of 36° SR using a refiner. The concentration of pulp fibers in the thin stock was 1 wt. %, based on the mass of the pulp suspension. Additives were added to the thin stock, such as cationic starch in a quantity of 0.4 wt. %, as a neutral sizing agent alkyl ketene dimer (AKD) in a quantity of 0.48 wt. %, wet strength polyamine polyamide epichlorohydrin resin (Kymene®) in a quantity of 0.36 wt. % and a natural $CaCO_3$ in a quantity of 10 wt. %. The quantities given refer to the atro pulp mass. The thin stock, the pH value of which was adjusted to about 7.5, was transferred from the headbox to the screen of the paper machine, followed by sheet formation with dewatering of the web in the screen section of the paper machine. In the press section of the paper machine, further dewatering of the web was carried out to a water content of 60 wt. %, based on the web weight. Further drying was carried out in the drying section of the paper machine with heated drying cylinders. The result was a base paper with a weight per unit area of 132 $g/m^2$ and a moisture content of about 7%.

Production of the Recording Materials According to the Invention and the Comparative Examples The side (rear side) of the base paper opposite the side to be printed was coated in the extruder with a synthetic resin layer consisting of the polymer mixtures listed in Table 1. The cooling cylinder was selected such that the resulting surface of the rear side has a roughness of 0.9 µm, measured as $R_z$ value according to DIN 4768.

The surface (front side) of the base paper intended for printing was laminated with a three-layer biaxially oriented polypropylene film (plastic film, HIPHANE BOPP, Hwaseung Industries Co. Ltd) in the extruder after irradiation with a corona discharge, and a film of low-density polyethylene (LD-PE) was extruded between the front side of the base paper and the biaxially oriented polypropylene film. The thickness of the adhesion-promoting polyethylene film (adhesive layer) was 20 µm.

The carrier material obtained was then coated with a barrier layer on the side coated with the plastic film (25 wire doctor blade) and dried at 78° C. for three minutes. The composition of the respective barrier layer is given in Table 2. The application quantities of the barrier layer were selected such that a dry application of 1.6 g/m$^2$ was obtained in each case.

In the next step, a dye-receiving layer was applied to the barrier layer (15 wire doctor blade) and dried (2 minutes, 78° C.). The application quantity of the coating compound for the dye-receiving layer was selected such that a dry application of 0.5 g/m$^2$ was obtained. The composition of the coating compound for the dye-receiving layer is given in Table 3.

Production of the Coating Compound for the Dye-Receiving Layer 31.70 g of a vinyl chloride/acrylate copolymer dispersion with a solids content of 56 wt. % (PrintRite® DP 281.E, manufacturer Lubrizol) and 13.58 g of a vinyl chloride/vinyl acetate/vinylidene chloride dispersion with a solids content of 56 wt. % (Vycar® 577 E, manufacturer Lubrizol) were mixed with 3.15 g of a 30% aqueous suspension of colloidal silica (Ludox® AM X4931, manufacturer Grace), 0.95 g of polydimethylsiloxane (TegoGlide® 482, manufacturer Evonik Industries), 0.25 g of a defoaming agent (Tego Foamex® 825, manufacturer Evonik Industries), 0.08 g of a wetting agent (Capstone® FS 30, 25%, manufacturer DuPont) and 50.29 g of water.

The structure of the recording materials obtained according to the examples and comparative examples can be found in Table 4. The offset in the printer was determined using the recording materials obtained in this way, and the dye migration and cloudiness (mottling) were evaluated by the methods described below.

As can be clearly seen from the results in Table 4, the quality of the synthetic resin layer on the rear side of the recording material plays a major role with regard to the offset that is critical in the printing process. Acceptable behavior in the multipass printing process, i.e., little or no offset, is only achieved with the recording materials according to the invention, the synthetic resin layer of which has an elastic modulus of at least 0.8 GPa.

Measurement Methods

Dye Migration Test

The samples are printed with the maximum color densities of yellow, cyan, magenta and black on the Mitsubishi CP-D70DW printer with a standard donor ribbon. The printing format is 10×15 cm and the color areas are 1×1 cm. These samples are hung at 80° C. oven temperature for 5 days. After 5 days, an evaluation of the dye penetration on the rear side of the printed sample is carried out using grades.

The evaluation is made as follows: no color penetration on the rear side is evaluated as grade 1; heavy and large-area color penetration is evaluated as grade 5. For this purpose, the relative grading is from grade 1 to grade 5.

Mottle Evaluation (Cloudiness)

Samples and printer CP-D70DW from Mitsubishi are preconditioned for 12 h at 40° C. and 80% relative atmospheric humidity. A 10×15 cm full-area black print is then performed in the existing climate. The mottle of the samples is evaluated in grades from 1 to 5. Grade 1 means no mottle (no cloudiness) and grade 5 means heavy mottle (heavy cloudiness). The grading between 1 and 5 is relative to the grades 1 and 5.

Elastic Modulus

The elastic modulus is determined according to the tensile strength test using the Lorentzen & Wettre tensile tester. For this purpose, samples of the synthetic resin layer are cut to 50 mm width and 120 mm length. The gauge length is set to 100 mm. The gauge speed is 100 mm/min. The thickness and weight per unit area of the samples are determined and entered into the "Elastic modulus" test program of the Lorentzen & Wettre tensile tester. The tensile strength test is then carried out on the samples. The elastic modulus is determined from the ratio between mechanical stress and strain in the linear region of the stress-strain diagram.

Method for Measuring Offset in the Print Image

The offset is determined using a crosshair. First, a print image is printed with different crosshairs. The printed crosshairs are then located on the print image. The offset is determined from the color shift of cyan, yellow, magenta (see FIG. 4, right crosshair) in the crosshair using a microscope. The offset is given by the sum of all color shifts. The offset is a measure of transport properties in the printer. In this case, a small offset or no offset (see FIG. 4, left cross hairs) is very desirable.

TABLE 1

Composition of the synthetic resin layer and the elastic modulus of the respective synthetic resin layer

| | A | B | C | D | E | F | G | H | I |
|---|---|---|---|---|---|---|---|---|---|
| HD-PE/wt. % | 80 | 75 | 70 | 60 | 80 | 80 | 80 | 0 | 100 |
| LD-PE/wt. % | 20 | 20 | 20 | 20 | 15 | 10 | 0 | 100 | 0 |
| TPX/wt. % | 0 | 5 | 10 | 20 | 0 | 0 | 0 | 0 | 0 |
| Calcium carbonate/wt. % | 0 | 0 | 0 | 0 | 5 | 10 | 20 | 0 | 0 |
| Thickness/µm | 20 | 20 | 20 | 20 | 20 | 20 | 20 | 20 | 20 |

TABLE 1-continued

| Composition of the synthetic resin layer and the elastic modulus of the respective synthetic resin layer | | | | | | | | | |
|---|---|---|---|---|---|---|---|---|---|
| | A | B | C | D | E | F | G | H | I |
| Solids content/% | 100 | 100 | 100 | 100 | 100 | 100 | 100 | 100 | 100 |
| Elastic modulus/GPa | 0.63 | 0.83 | 0.97 | 0.98 | 0.82 | 0.99 | 1.55 | 0.49 | 0.67 |

TABLE 2

| Composition of the coating compound of the barrier layer in wt. % Commercial product and solids content, and pH value of the coating compound | | |
|---|---|---|
| | Coating compound J | Coating compound K |
| Desalinated water | 79.16 | 79.00 |
| Gelatin (Imagel ® AP 71979, 290 Bloom, isoelectric. point = 8, Gelita AG) | 5.80 | 5.80 |
| $NH_3$ solution, 5% | 1.20 | 1.20 |
| $TiO_2$ (Ti-Pure RPS Vantage 71% in water, DuPont) | 2.75 | 2.91 |
| Optical brightener (Leucohor ® UO, 25% Archroma International) | 3.26 | 3.26 |
| Polyester polyurethane copolymer (PU-Coat DMP 105, 40% in water, Baumeister Chemicals & Consulting Gmbh & Co. KG) | 5.00 | 5.00 |
| Wetting agent (Capstone ® FS 30, 25% in water, DuPont) | 0.07 | 0.07 |
| Polyaziridine (PZ-33, 50% in IPA, Flevo Chemie B.V.) | 2.76 | 2.76 |
| Solids content | 10.04 | 12.31 |
| pH value | 8.5 | 8.5 |

TABLE 3

| Composition of the coating compound for the dye-receptive layer in wt. % Commercial product as well as solids content and pH value of the coating compound for the dye-receiving layer | | | | |
|---|---|---|---|---|
| | Coating compound L | Coating compound M | Coating compound N | Coating compound O |
| Desalinated water | 50.86 | 41.76 | 34.38 | 47.92 |
| Defoaming agent (TegoFoamex 825) | 0.25 | 0.29 | 0.24 | 0.17 |
| Vinyl chloride/acrylate copolymer dispersion (Printrite DP-281E) | 31.37 | 37.18 | 48.28 | 40.08 |
| Vinyl chloride/vinyl acetate/vinylidene chloride dispersion (Vycar 577 E) | 13.44 | 15.93 | 13.11 | 9.07 |
| Colloidal silica (Ludox AM X4931) | 3.12 | 3.69 | 3.04 | 2.10 |
| Polydimethyl siloxane (Tego Glide 482) | 0.89 | 1.06 | 0.87 | 0.60 |
| Wetting agent (Capstone FS 30) | 0.08 | 0.09 | 0.08 | 0.05 |
| Solids content | 27.00 | 32 | 36.4 | 29 |
| pH | 9 | 9 | 9 | 9 |

TABLE 4

| Structure and properties of the comparative examples and of the recording material according to the invention | | | | | |
|---|---|---|---|---|---|
| Structure | Comparison 1 | Invention 1 | Invention 2 | Invention 3 | Invention 4 |
| Dye-receiving layer | L | L | M | M | M |
| Barrier layer | J | J | J | K | K |
| Plastic film | HIPHANE BOPP | HIPHANE BOPP | HIPHANE BOPP | HIPHANE BOPP | HIPHANE BOPP |
| Polymer mixture of the adhesive layer | H | H | H | H | H |
| Base paper | Base paper | Base paper | Base paper | Base paper | Base paper |
| Polymer mixture of the synthetic resin layer | A | F | G | G | D |
| Elastic modulus of the synthetic resin layer/GPa | 0.61 | 0.99 | 1.55 | 1.55 | 0.98 |
| Offset | 6 mm | 1 mm | 0 mm | 0 mm | 0 mm |
| Migration (score) | 1 | 1 | 1 | 1 | 1 |
| Mottle test (score) | 1 | 1 | 1 | 1 | 1 |

The invention claimed is:

1. A recording material for dye sublimation printing comprising a. a base paper having a front and a rear side b. at least one synthetic resin layer on at least the rear side of the base paper c. a dye-receiving layer which is arranged on the front side of the base paper, d. at least one plastic film which is arranged between the base paper and the dye-receiving layer and e. optionally a barrier layer which is arranged between the plastic film and the dye-receiving layer, wherein the synthetic resin layer has an elastic modulus of at least 0.8 GPa, characterized in that the synthetic resin layer:

(i) contains a content of at least 5 wt. % of one of the polymers 4-methylpentene-1 homo- and copolymers, or (ii) consists of 5 to 25 wt. % pigment, 75 to 85 wt. % HD-PE, and 0 to 15 wt. % LD-PE, based on the dry weight of the synthetic resin layer.

2. The recording material according to claim 1, characterized in that the synthetic resin layer has an elastic modulus of at least 0.90 GPa.

3. The recording material according to any one of the preceding claims, characterized in that the synthetic resin layer has a pigment content of at least 5 wt. %, based on the dry weight of the synthetic resin layer.

4. The recording material according to claim 3, characterized in that the pigments are selected from calcium carbonate, aluminum oxides, aluminum silicates or mixtures thereof.

5. The recording material according to claim 1, characterized in that the plastic film is a biaxially oriented plastic film.

6. The recording material according to claim 1, characterized in that the recording material comprises a barrier layer as part of the plastic film and the optional barrier layer being arranged between the plastic film and the dye-receiving layer is not present.

7. The recording material according to claim 6, characterized in that a mixture of a water-dispersible polymeric binder and gelatin is used as the barrier layer.

8. The recording material according to claim 7, characterized in that the water-dispersible polymeric binder in the barrier layer is a polyester-polyurethane copolymer.

9. The recording material according to claim 1, characterized in that the dye-receiving layer contains an optical brightener and a polar binder.

10. The recording material according to claim 9, characterized in that the polar binder in the dye-receiving layer contains polyvinyl alcohol modified with carbonyl or carboxyl groups.

11. The recording material according to claim 9 or 10, characterized in that the polar binder constitutes a content of 5 to 20 wt. % of the dye-receiving layer.

12. The recording material according to claim 1, characterized in that an adhesive layer which is arranged between the base paper and the plastic film is additionally applied to the front side of the base paper.

13. The recording material according to claim 12, characterized in that the adhesive layer consists of LD-PE.

* * * * *